(12) United States Patent
Perisic et al.

(10) Patent No.: US 8,614,564 B2
(45) Date of Patent: Dec. 24, 2013

(54) SYSTEMS AND METHODS FOR PROVIDING POWER TO A LOAD BASED UPON A CONTROL STRATEGY

(75) Inventors: Milun Perisic, Torrance, CA (US);
Lateef A. Kajouke, San Pedro, CA (US); Ray M. Ransom, Big Bear City, CA (US)

(73) Assignee: GM Global Technology Operations LLS, Detroit, MI (US)

( * ) Notice: Subject to any disclaimer, the term of this patent is extended or adjusted under 35 U.S.C. 154(b) by 96 days.

(21) Appl. No.: 12/949,439

(22) Filed: Nov. 18, 2010

(65) Prior Publication Data

US 2012/0126755 A1 May 24, 2012

(51) Int. Cl.
*H02J 7/04* (2006.01)
*H02J 7/00* (2006.01)
*H02J 1/10* (2006.01)
*H02M 3/335* (2006.01)

(52) U.S. Cl.
USPC ............... 320/145; 320/138; 363/17; 363/65

(58) Field of Classification Search
USPC ................................................ 320/145, 138
See application file for complete search history.

(56) References Cited

U.S. PATENT DOCUMENTS

| | | |
|---|---|---|
| 4,213,173 A | 7/1980 | Link et al. |
| 4,669,036 A | 5/1987 | Cowett, Jr. |
| 5,159,539 A | 10/1992 | Koyama |
| 5,189,603 A | 2/1993 | Sashida et al. |
| 5,274,538 A | 12/1993 | Sashida et al. |
| 5,285,365 A | 2/1994 | Yamato et al. |
| 5,461,297 A | 10/1995 | Crawford |
| 5,545,971 A | 8/1996 | Gomez et al. |
| 5,949,659 A | 9/1999 | Lesche |
| 6,034,513 A | 3/2000 | Farrington et al. |
| 6,147,886 A | 11/2000 | Wittenbreder |
| 6,351,397 B1 | 2/2002 | Sawa et al. |
| 6,496,343 B2 | 12/2002 | Mahlein et al. |
| 6,538,909 B2 | 3/2003 | Goodarzi et al. |
| 6,566,764 B2 | 5/2003 | Rebsdorf et al. |

(Continued)

FOREIGN PATENT DOCUMENTS

| | | |
|---|---|---|
| CN | 1946587 A | 4/2007 |
| CN | 101136596 A | 3/2008 |

(Continued)

OTHER PUBLICATIONS

Office Action, dated Oct. 5, 2011, for U.S. Appl. No. 12/413,181.

(Continued)

*Primary Examiner* — M'Baye Diao
(74) *Attorney, Agent, or Firm* — Ingrassia Fisher & Lorenz, P.C.

(57) ABSTRACT

Systems and methods are provided for an electrical system. The electrical system includes a load, an interface configured to receive a voltage from a voltage source, and a controller configured to receive the voltage from the voltage source through the interface and to provide a voltage and current to the load. Wherein, when the controller is in a constant voltage mode, the controller provides a constant voltage to the load, when the controller is in a constant current mode, the controller provides a constant current to the load, and when the controller is in a constant power mode, the controller provides a constant power to the load.

17 Claims, 4 Drawing Sheets

(56) References Cited

U.S. PATENT DOCUMENTS

| | | | |
|---|---|---|---|
| 6,583,519 B2 | 6/2003 | Aberle et al. | |
| 6,614,132 B2 | 9/2003 | Hockney et al. | |
| 6,989,613 B2 | 1/2006 | Andrews et al. | |
| 6,998,732 B2 | 2/2006 | Xing et al. | |
| 7,330,363 B2 | 2/2008 | Ponnaluri et al. | |
| 7,483,282 B2 | 1/2009 | Kajouke et al. | |
| 7,492,221 B2 | 2/2009 | Lawson et al. | |
| 7,525,296 B2 | 4/2009 | Billig et al. | |
| 7,558,087 B2 | 7/2009 | Meysenc et al. | |
| 7,599,204 B2 | 10/2009 | Kajouke et al. | |
| 7,679,941 B2 | 3/2010 | Raju et al. | |
| 7,764,527 B2 | 7/2010 | Takayanagi | |
| 8,063,606 B2* | 11/2011 | Veselic | 320/119 |
| 8,199,545 B2 | 6/2012 | Nguyen et al. | |
| 8,288,887 B2 | 10/2012 | Ransom et al. | |
| 2001/0012207 A1 | 8/2001 | Nomura | |
| 2001/0026427 A1 | 10/2001 | Mahlein et al. | |
| 2001/0036086 A1 | 11/2001 | Pascu et al. | |
| 2002/0044468 A1 | 4/2002 | Goodarzi et al. | |
| 2002/0109406 A1 | 8/2002 | Aberle et al. | |
| 2002/0176261 A1 | 11/2002 | Norrga | |
| 2003/0102718 A1 | 6/2003 | Hockney et al. | |
| 2004/0026929 A1 | 2/2004 | Rebsdorf et al. | |
| 2004/0041543 A1 | 3/2004 | Brooks et al. | |
| 2004/0066663 A1 | 4/2004 | Raichle | |
| 2004/0119449 A1 | 6/2004 | Matley | |
| 2004/0257271 A1* | 12/2004 | Jacobson et al. | 342/175 |
| 2005/0206343 A1 | 9/2005 | Ichinose et al. | |
| 2006/0133120 A1 | 6/2006 | Sato et al. | |
| 2007/0035265 A1 | 2/2007 | Balog, Jr. et al. | |
| 2007/0139975 A1 | 6/2007 | Yamauchi et al. | |
| 2007/0274109 A1 | 11/2007 | Oyobe et al. | |
| 2008/0013351 A1 | 1/2008 | Alexander | |
| 2008/0055938 A1 | 3/2008 | Kajouke et al. | |
| 2008/0055954 A1 | 3/2008 | Kajouke et al. | |
| 2008/0122422 A1 | 5/2008 | Zhang et al. | |
| 2008/0130339 A1 | 6/2008 | McDonald et al. | |
| 2009/0033393 A1 | 2/2009 | Park et al. | |
| 2009/0059633 A1 | 3/2009 | Hara et al. | |
| 2009/0251938 A1 | 10/2009 | Hallak | |
| 2009/0322287 A1* | 12/2009 | Ozeki et al. | 320/145 |
| 2010/0103703 A1* | 4/2010 | Nishiyama et al. | 363/17 |
| 2010/0128503 A1 | 5/2010 | Liu et al. | |
| 2010/0244773 A1 | 9/2010 | Kajouke | |
| 2011/0031927 A1 | 2/2011 | Kajouke et al. | |
| 2011/0031930 A1 | 2/2011 | Kajouke | |
| 2011/0032732 A1 | 2/2011 | Hsu | |
| 2011/0080151 A1 | 4/2011 | Rahardjo et al. | |
| 2011/0089928 A1 | 4/2011 | O'Gorman et al. | |
| 2011/0227407 A1 | 9/2011 | Ransom | |
| 2012/0014140 A1 | 1/2012 | Kajouke et al. | |
| 2012/0112549 A1 | 5/2012 | Perisic et al. | |
| 2012/0113683 A1 | 5/2012 | Perisic et al. | |
| 2012/0113700 A1 | 5/2012 | Kajouke et al. | |

FOREIGN PATENT DOCUMENTS

| | | |
|---|---|---|
| DE | 102007040550 A1 | 3/2008 |
| GB | 2459542 A | 11/2009 |
| JP | 2008306855 A | 12/2008 |
| WO | 0191279 A1 | 11/2001 |

OTHER PUBLICATIONS

Prathapan, P.T., et al., "Feedforward Current Control of Boost-Derived Single-phase PFC Converters," IEEE Applied Power Electronics Conference and Exposition, Mar. 2005, pp. 1716-1722, vol. 3.

Figueres, E., et al. "A Control Circuit With Load-Current Injection for Single-Phase Power-Factor-Correction Rectifiers," IEEE Transactions on Industrial Electronics, Jun. 2007, pp. 1272-1281, vol. 54, No. 3.

Kajouke, L.A., "Systems and Methods for Bi-Directional Energy Delivery With Galvanic Isolation," U.S. Appl. No. 12/535,975, filed Aug. 5, 2009.

Kajouke, L.A., et al., "Charging System with Galvanic Isolation and Multiple Operating Modes," U.S. Appl. No. 12/535,994, filed Aug. 5, 2009.

Ransom, R.M., "Systems and Methods for Deactivating a Matrix Converter," U.S. Appl. No. 12/725,265, filed Mar. 16, 2010.

Kajouke, L.A., et al., "Systems and Methods for Reducing Transient Voltage Spikes in Matrix Converters," U.S. Appl. No. 12/839,134, filed Jul. 19, 2010.

Ransom R.M., et al. "Systems and Methods for Commutating Inductor Current Using a Matrix Converter," U.S. Appl. No. 12/622,088, filed Nov. 19, 2009.

Perisic, M., et al. "Compensation for Electrical Converter Nonlinearities," U.S. Appl. No. 12/941,552, filed Nov. 8, 2010.

Perisic, M., et al. "Compensation for Electrical Converter Nonlinearities," U.S. Appl. No. 12/941,521, filed Nov. 8, 2010.

Kajouke, L.A., et al. "Systems and Methods for Reducing Harmonic Distortion in Electrical Converters," U.S. Appl. No. 12/941,488, filed Nov. 8, 2010.

German Office Action, dated Mar. 21, 2012, for German Patent Application No. 10 2011 085 063.5.

Chu, Grace, et al., "A Unified Approach for the Derivation of Robust Control for Boost PFC Converters," IEEE Transactions on Power Electronics, Nov. 2009, pp. 2531-2544, vol. 24, Issue: 11.

USPTO, U.S. "Final Office Action" mailed Jun. 28, 2012, for U.S. Appl. No. 12/535,994, filed Aug. 5, 2008.

USPTO, U.S. "Final Office Action" mailed May 10, 2012, for U.S. Appl. No. 12/413,181, filed Mar. 27, 2009.

USPTO, U.S. "Notice of Allowance" mailed Jun. 11, 2012, for U.S. Appl. No. 12/622,088, filed Nov. 19, 2009.

U.S. Office Action, dated Nov. 25, 2011, for U.S. Appl. No. 12/622,088.

U.S. Office Action, dated Jan. 23, 2012, for U.S. Appl. No. 12/535,994.

Delorme, Gilles M., et al. "Methods and Systems for Controlling Vehicle Defrost Units," U.S. Appl. No. 12/871,664, filed Aug. 30, 2010.

Ransom, Ray., et al. "Systems and Methods for Initializing a Charging System," U.S. Appl. No. 13/149,484, filed May 31, 2011.

German Office Action, dated Jan. 27, 2012, for German Patent Application No. 10 2010 031 615.6.

U.S. Office Action, dated Feb. 8, 2012, for U.S. Appl. No. 12/535,975.

Perisic, M., et al. "Systems and Methods for Providing Power to a Load Based Upon a Control Strategy," U.S. Appl. No. 13/222,961, filed Aug. 31, 2011.

Kajouke, L.A., et al. "Discharging a DC Bus Capacitor of an Electrical Converter System," U.S. Appl. No. 13/090,911, filed Apr. 20, 2011.

Office Action, dated Jul. 23, 2012, for U.S. Appl. No. 12/725,265.

Final Office Action, dated Aug. 2, 2012, for U.S. Appl. No. 12,535,975.

Office Action, dated Aug. 29, 2012, for U.S. Appl. No. 12/839,134.

Office Action, dated Oct. 24, 2012, for U.S. Appl. No. 12/941,552.

Notice of Allowance, dated Nov. 16, 2012, for U.S. Appl. No. 12/535,975.

Notice of Allowance, dated Nov. 15, 2012, for U.S. Appl. No. 12/725,265.

USPTO "Notice of Allowance" mailed Jan. 25, 2013; U.S. Appl. No. 12/839,134, filed Jul. 19, 2010.

CPO, Chinese Office Action, for Chinese Application No. 201010247400.4, mailed Jan. 23, 2013.

CPO, Chinese Office Action, for Chinese Application No. 201010556242.0, mailed Feb. 1, 2013.

USPTO, Office Action in U.S. Appl. No. 12/941,488, mailed Mar. 20, 2013.

USPTO, Notice of Allowance and Fee(s) Due for U.S. Appl. No. 12/941,552, mailed Feb. 20, 2013.

USPTO, Notice of Allowance and Fee(s) Due for U.S. Appl. No. 12/535,994, mailed Sep. 7, 2012.

USPTO, Notice of Allowance and Fee(s) Due mailed Jun. 26, 2013 for U.S. Appl. No. 13/149,484.

(56) References Cited

OTHER PUBLICATIONS

USPTO, Notice of Allowance and Fee(s) Due mailed Jul. 19, 2013 for U.S. Appl. No. 12/941,521.
USPTO, Notice of Allowance and Fee(s) Due for U.S. Appl. No. 12/941,488, mailed Jul. 31, 2013.
USPTO, Office Action for U.S. Appl. No. 12/413,181, mailed Aug. 15, 2013.
USPTO, Notice of Allowance and Fee(s) Due for U.S. Appl. No. 13/222,961, mailed Sep. 18, 2013.
USPTO, Notice of Allowance and Fee(s) Due for U.S. Appl. No. 13/149,484, mailed Oct. 11, 2013.

* cited by examiner

SYSTEMS AND METHODS FOR PROVIDING POWER TO A LOAD BASED UPON A CONTROL STRATEGY

STATEMENT REGARDING FEDERALLY SPONSORED RESEARCH OR DEVELOPMENT

This invention was made with Government support under Agreement No. DE-FC26-07NT43123, awarded by the United States Department of Energy. The Government has certain rights in this invention.

TECHNICAL FIELD

Embodiments of the subject matter described herein relate generally to electrical systems in automotive vehicles, and more particularly, embodiments of the subject matter relate to a control strategy for energy delivery systems.

BACKGROUND

Plug-in Hybrid and fully electric vehicles have become increasingly popular in recent years. These vehicles typically have large battery systems which can take many hours to charge while consuming large amounts of power. Current charging systems have a fixed charging strategy that requires that the vehicle be plugged in to a residential or commercial power grid.

Accordingly, it is desirable to have a flexible electrical system and method for providing power to a load. Other desirable features and characteristics will become apparent from the subsequent detailed description and the appended claims, taken in conjunction with the accompanying drawings and this background.

BRIEF SUMMARY

In accordance with one embodiment, a charging system is provided. The charging system includes a rechargeable battery, an interface configured to receive a voltage from a voltage source, and a controller configured to receive the voltage from the voltage source through the interface and to recharge the rechargeable battery using the received voltage. Wherein, when the controller is in a constant voltage mode, the controller provides a constant voltage to the rechargeable battery, when the controller is in a constant current mode, the controller provides a constant current to the rechargeable battery, and when the controller is in a constant power mode, the controller provides a constant power to the rechargeable battery.

In accordance with another embodiment, an electrical system, is provided. The electrical system includes a load, an interface configured to receive a voltage from a voltage source, and a controller configured to receive the voltage from the voltage source through the interface and to provide a voltage and current to the load. Wherein, when the controller is in a constant voltage mode, the controller provides a constant voltage to the load, when the controller is in a constant current mode, the controller provides a constant current to the load, and when the controller is in a constant power mode, the controller provides a constant power to the load.

In yet another embodiment, a method of providing, by a controller, a voltage and current to a load from a power source is provided. The method includes, providing, when the controller is in a constant current mode, a constant current charge to the load, providing, when the controller is in a constant voltage mode, a constant voltage to the load, and providing, when the controller is in a constant power mode, a constant power charge to the load.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

The following description refers to elements or nodes or features being "connected" or "coupled" together. As used herein, unless expressly stated otherwise, "connected" means that one element/node/feature is directly joined to (or directly communicates with) another element/node/feature, and not necessarily mechanically. Likewise, unless expressly stated otherwise, "coupled" means that one element/node/feature is directly or indirectly joined to (or directly or indirectly communicates with) another element/node/feature, and not necessarily mechanically. Thus, although the figures may depict one exemplary arrangement of elements, additional intervening elements, devices, features, or components may be present in an embodiment of the depicted subject matter. In addition, certain terminology may also be used in the following description for the purpose of reference only, and thus is not intended to be limiting. The terms "first", "second" and other such numerical terms referring to structures do not imply a sequence or order unless clearly indicated by the context.

As used herein, a "node" means any internal or external reference point, connection point, junction, signal line, conductive element, or the like, at which a given signal, logic level, voltage, data pattern, current, or quantity is present. Furthermore, two or more nodes may be realized by one physical element (and two or more signals can be multiplexed, modulated, or otherwise distinguished even though received or output at a common node).

Figure 1:
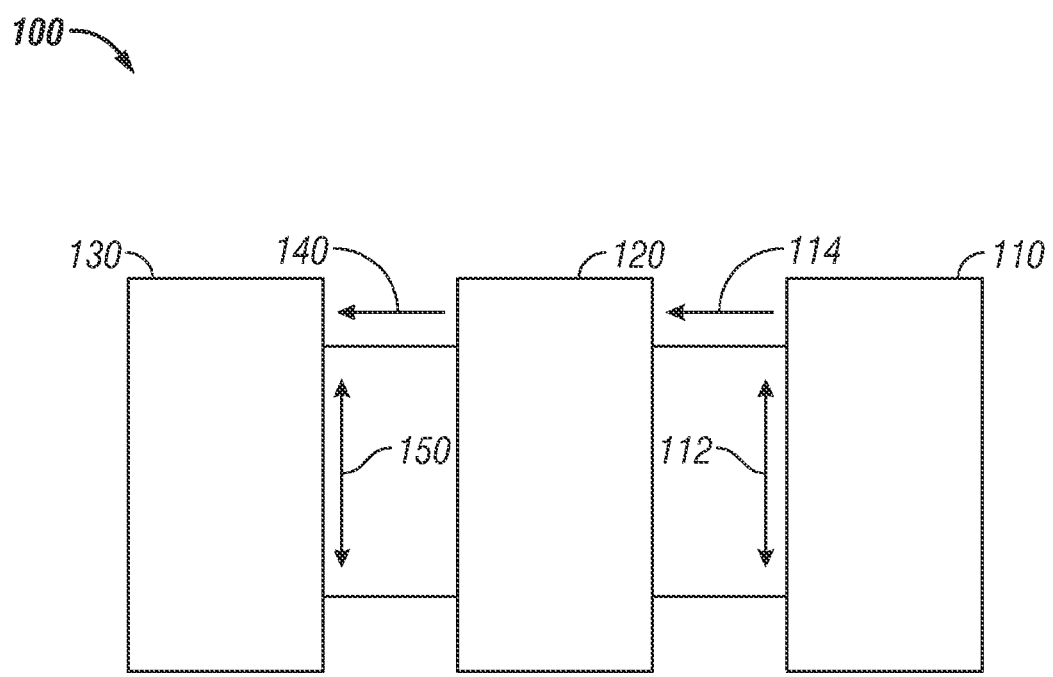
FIG. 1 is a block diagram of electrical system in accordance with one embodiment.

FIG. 1 illustrates an exemplary embodiment of an electrical system 100. The electrical system 100 includes a voltage or current source 110, an electrical control system 120 and a load 130.

The voltage or current source 110 may be, for example, an electrical grid, such as one provided to a home or business by a power company, a generator, such as a diesel engine generator, a solar power system, a wind turbine system or any other type of power generation system, a battery system or any combination thereof. The voltage or current source provides a voltage, represented by arrow 112, and a current, represented by arrow 114, to the control system 120.

The control system 120, which may include, for example, a power converter and a controller, is connected between the voltage or current source 110 and the load 130 and provides a voltage, represented by arrow 150, and a current, represented by arrow 140, to the load as described in further detail below.

In one embodiment the load 130 may be a battery and the electrical control system 120 may control how the battery is charged using the voltage or current source 110. In another embodiment, the load 130 may be, for example, a power grid or an electronic device, and the electrical control system 120 controls how power is supplied to the load 130.

The electrical control system 120 has three modes which can be implemented based upon a type of load 130, a state of the load 130, a type of the voltage or current source 110 and a state of the voltage or current source 110. The state of the load 130 may be, for example, a current voltage across the load 130. The state of the voltage or current source may be, for example, a cost associated with drawing power from the voltage or current source 110 and/or an amount of power currently available from the voltage or current source 110. The mode that the electrical control system is in may also be adjusted by a user, system administrator or the like.

In a first mode, the electrical control system 120 provides a constant current (indicated by arrow 140) to the load 130. A constant current mode is useful, for example, for charging a battery when the battery state of charge is low. In a second mode, the electrical control system 120 provides a constant voltage (represented by arrow 150) to the load 130. A constant voltage is useful, for example, to charge a battery when the battery is close to a full charge and to a variety of electronic and passive loads that have voltage supply requirement. In one embodiment, if the load 130 is a battery, the electrical control system 120 may switch between the fist and second modes based upon the state of the battery, for example, the charge level of the battery. In many cases, a battery is charged most efficiently by providing a constant current when the battery is low and providing a constant voltage when the battery is close to a full charge.

In a third mode, the electrical control system provides a constant power to the load 130, where the amount of power provided to the load 130 is the amount of current 140 provided to the load 130 multiplied by the amount of voltage 150 provided to the load 130. As discussed in further detail below, the constant power can be provided by providing a fixed current 140 and a fixed voltage 150 to the load 130, or by controlling the product of the current 140 and voltage 150 provided to the load 130.

By providing a constant power to the load 130, the electrical control system 120 can limit the amount of power drawn from the voltage or current source 110. This mode has numerous advantages and uses. If, for example, the voltage source 110 is a power grid, a user can select a maximum amount of power that can be drawn from the grid at any given time. For example, if the cost of drawing power from the grid varies (e.g., based upon the time of day), the user can reduce a maximum draw during the peak hours and increase the maximum draw during off hours to reduce their electric bill. In another embodiment, if the voltage or current source 110 supplies a variable amount of power (i.e., if the voltage or current source 110 is a solar, wind or battery system), the electric system controller can adjust the amount of power being supplied to the load 130 based upon the available power.

Figure 2:
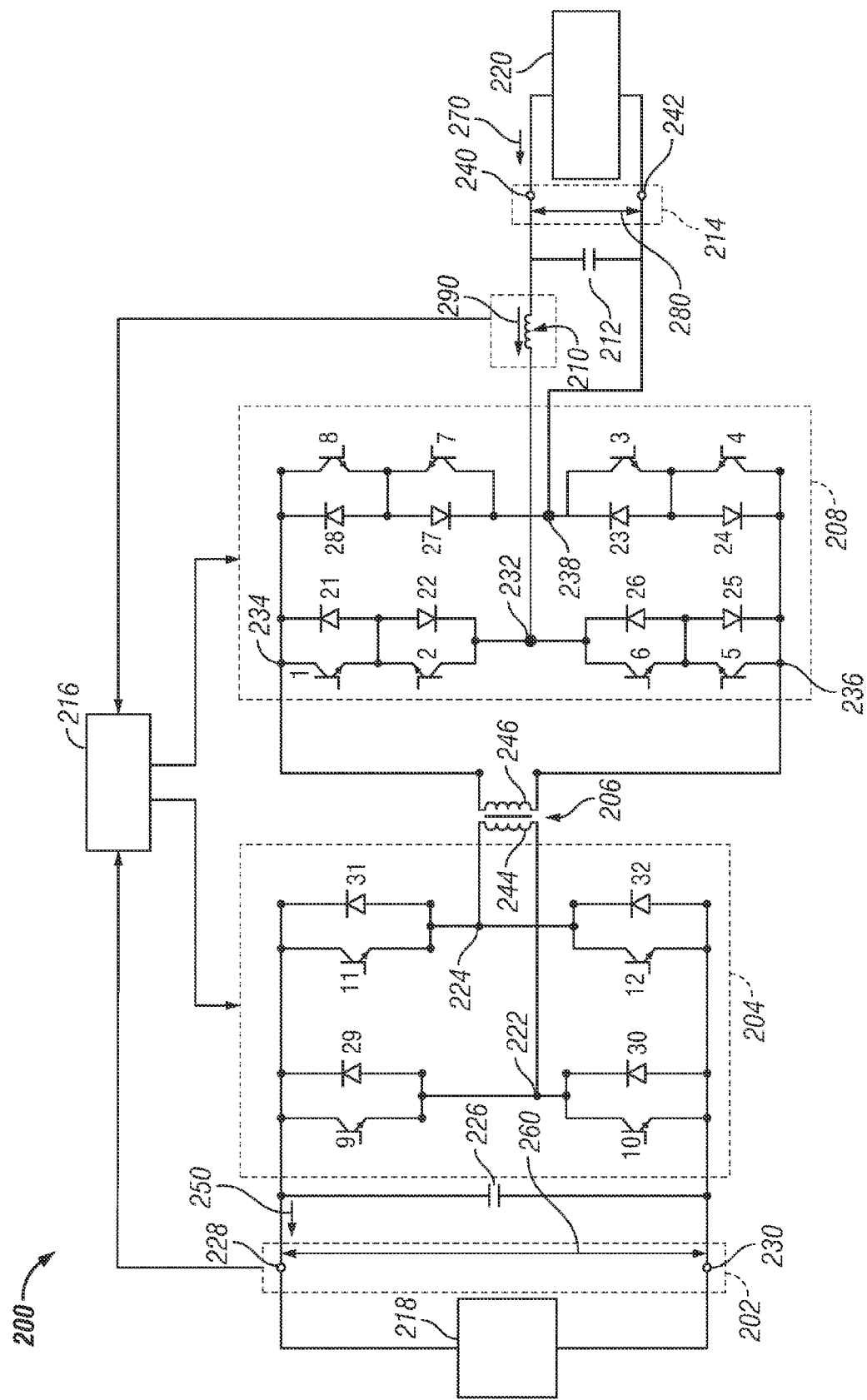
FIG. 2 is a schematic diagram of another electrical system suitable for use in a vehicle in accordance with one embodiment.

FIG. 2 depicts an exemplary embodiment of an electrical system 200 (or alternatively, a charging system, charger or charging module) suitable for use in a vehicle, such as, for example, an electric and/or hybrid vehicle. While the description below relates to a charging system for an electric and/or hybrid vehicle, one of ordinary skill in the art would recognize that other electrical systems could be created or modified to take advantage of the features discussed herein.

The electrical system 200 includes, without limitation, a first interface 202, a first energy conversion module 204, an isolation module 206, a second energy conversion module 208, an inductive element 210, a capacitive element 212, a second interface 214, and a control module 216. The first interface 202 generally represents the physical interface (e.g., terminals, connectors, and the like) for coupling the electrical system 200 to a DC energy source 218 and the second interface 214 generally represents the physical interface (e.g., terminals, connectors, and the like) for coupling the electrical system 200 to an alternating current (AC) energy source 220. Accordingly, for convenience, the first interface 202 may be referred to herein as the DC interface and the second interface 214 may be referred to herein as the AC interface. In an exemplary embodiment, the control module 216 is coupled to the conversion modules 204, 208 and operates the conversion modules 204, 208 to achieve a desired power flow from the AC energy source 220 to the DC energy source 218, as described in greater detail below.

In an exemplary embodiment, the DC energy source 218 (or alternatively, the energy storage source or ESS) is capable of receiving a direct current ($i_{DC}$) (indicated by arrow 250) from the electrical system 200 at a particular DC voltage level ($V_{DC}$) (indicated by arrow 260). In accordance with one embodiment, the DC energy source 218 is realized as a rechargeable high-voltage battery pack having a nominal DC voltage range from about 200 to about 500 Volts DC. In this regard, the DC energy source 218 may comprise the primary energy source for another electrical system and/or an electric motor in a vehicle. For example, the DC energy source 218 may be coupled to a power inverter that is configured to provide voltage and/or current to the electric motor, which, in turn, may engage a transmission to drive the vehicle in a conventional manner. In other embodiments, the DC energy source 218 may be realized as a battery, a fuel cell, an ultracapacitor, or another suitable energy storage element.

The AC energy source 220 (or power source) is configured to provide an AC current ($i_{AC}$) (indicated by arrow 270) to the charging system 200 at a particular AC voltage level ($V_{AC}$) (indicated by arrow 280) and may be realized as a main power supply or main electrical system for a building, residence, or another structure within an electric power grid (e.g., mains electricity or grid power). In accordance with one embodiment, the AC energy source 220 comprises a single-phase power supply, as is common to most residential structures, which varies depending on the geographic region. For example, in the United States, the AC energy source 220 may be realized as 220 Volts (RMS) or 240 Volts (RMS) at 60 Hz, while in other regions the AC energy source 220 may be realized as 210 Volts (RMS) or 220 Volts (RMS) at 50 Hz. In alternative embodiments, the AC energy source 220 may be realized as any AC energy source suitable for operation with the charging system 200.

As described in greater detail below, the DC interface 202 is coupled to the first conversion module 204 and the AC interface 214 is coupled to the second conversion module 208 via the inductive element 210. The isolation module 206 is coupled between the conversion modules 204, 208 and provides galvanic isolation between the two conversion modules 204, 208. The control module 216 is coupled to the conversion modules 204, 208 and operates the second conversion module 208 to convert energy from the AC energy source 220 to high-frequency energy across the isolation module 206 which is then converted to DC energy at the DC interface 202 by the conversion module 204. It should be understood that although the subject matter may be described herein in the context of a grid-to-vehicle application (e.g., the AC energy source 220 delivering energy to the DC energy source 218) for purposes of explanation, in other embodiments, the subject matter described herein may be implemented and/or utilized in vehicle-to-grid applications (e.g., the DC energy source 218 delivering energy to the AC interface 214 and/or AC energy source 220).

In order to charge the DC energy source 218, the first conversion module 204 converts high-frequency energy at nodes 222 and 224 to DC energy that is provided to the DC energy source 218 at the DC interface 202. In this regard, the first conversion module 204 operates as a rectifier when converting high frequency AC energy to DC energy. In the illustrated embodiment, the first conversion module 204 comprises four switching elements (9-12) with each switching element having a diode (29-32) configured antiparallel to the respective switching element to accommodate bidirectional energy delivery. As shown, a capacitor 226 is configured electrically in parallel across the DC interface 202 to reduce voltage ripple at the DC interface 202, as will be appreciated in the art.

In an exemplary embodiment, the switching elements (9-12) are transistors, and may be realized using any suitable semiconductor transistor switch, such as an insulated gate bipolar transistor, a metal-oxide semiconductor field effect transistor (e.g., a MOSFET), or any other comparable device known in the art. The switches and diodes are antiparallel, meaning the switch and diode are electrically in parallel with reversed or inverse polarity. The antiparallel configuration allows for bidirectional current flow while blocking voltage unidirectionally, as will be appreciated in the art. In this configuration, the direction of current through the switches is opposite to the direction of allowable current through the respective diodes. The antiparallel diodes are connected across each switch to provide a path for current to the DC energy source 218 for charging the DC energy source 218 when the respective switch is off. As described in greater detail below, in an exemplary embodiment, the control module 216 operates the switches of the first conversion module 204 to provide a path for current from the DC energy source 218 to the isolation module 206 to provide an injection current at nodes 234, 236 of the second conversion module 208.

In the illustrated embodiment, switch 9 is connected between node 228 of the DC interface 202 and node 222 and configured to provide a path for current flow from node 228 to node 222 when switch 9 is closed. Diode 29 is connected between node 222 and node 228 and configured to provide a path for current flow from node 222 to node 228 (e.g., diode 29 is antiparallel to switch 9). Switch 10 is connected between node 230 of the DC interface 202 and node 222 and configured to provide a path for current flow from node 222 to node 230 when switch 10 is closed, while diode 30 is connected between node 222 and node 230 and configured to provide a path for current flow from node 230 to node 222. In a similar manner, switch 11 is connected between node 228 and node 224 and configured to provide a path for current flow from node 228 to node 224 when switch 11 is closed, diode 31 is connected between node 224 and the DC interface 202 and configured to provide a path for current flow from node 224 to node 228, switch 12 is connected between node 230 and node 224 and configured to provide a path for current flow from node 224 to node 230 when switch 12 is closed, and diode 32 is connected between node 224 and the DC interface 202 and configured to provide a path for current flow from the node 230 to node 224.

In an exemplary embodiment, the second conversion module 208 facilitates the flow of current (or energy) from the AC energy source 220 and/or inductive element 210 to the isolation module 206. In the illustrated embodiment, the second conversion module 208 is realized as a front end single-phase matrix converter comprising eight switching elements (1-8) with each switching element having a diode (21-28) configured antiparallel to the respective switching element, in a similar manner as set forth above in regards to the first conversion module 204. For convenience, but without limitation, the second conversion module 208 may alternatively be referred to herein as a matrix conversion module (or matrix converter) or a cycloconverter. As described in greater detail below, the control module 216 modulates (e.g., opens and/or closes) the switches (1-8) of the matrix converter 208 to produce a high-frequency voltage at nodes 222, 224 that achieves a desired power flow to the DC interface 202 and/or DC energy source 218.

In the illustrated embodiment of FIG. 2, a first pair of switches (1, 2) and diodes (21, 22) are coupled between node 232 and node 234, with the first pair of switch and antiparallel diode (e.g., 1 and 21) being configured with opposite polarity as the second pair of switch and antiparallel diode (e.g., 2 and 22). In this manner, switch 1 and diode 22 are configured to provide a path for current flow from node 234 through switch 1 and diode 22 to node 232 when switch 1 is closed, turned on, or otherwise activated and the voltage at node 234 is more positive than the voltage at node 232. Switch 2 and diode 21 are configured to provide a path for current flow from node 232 through switch 2 and diode 21 to node 234 when switch 2 is closed, turned on, or otherwise activated and the voltage at node 232 is more positive than the voltage at node 234. In a similar manner, a second pair of switches (3, 4) and diodes (23, 24) are coupled between node 236 and node 238, a third pair of switches (5, 6) and diodes (25, 26) are coupled between node 232 and node 236, a fourth pair of switches (7, 8) and diodes (27, 28) are coupled between node 234 and node 238.

In the illustrated embodiment, switches 1, 3, 5, and 7 comprise a first set of switches which are capable of commutating the current through the inductive element 210 ($i_L$) (indicated by arrow 290) from node 232 to node 238 when the current through the inductive element 210 is flowing in a negative direction (e.g., $i_L<0$) and switches 2, 4, 6, and 8 comprise a second set of switches that are capable of commutating the current through the inductive element 210 from node 238 to node 232 when the current through the inductive element 210 is flowing in a positive direction (e.g., $i_L>0$), as described in greater detail below. In other words, switches 1, 3, 5, 7 are capable of conducting at least a portion of current flowing in a negative direction through the inductive element 210 (e.g., $i_L<0$) and switches 2, 4, 6, 8 are capable of conducting at least a portion of current flowing in a positive direction through the inductive element 210 (e.g., $i_L>0$). As used herein, commutating should be understood as the process of cycling the current through the inductive element 210 through switches and diodes of the matrix converter 208 such that the flow of current through the inductive element 210 is not interrupted.

In an exemplary embodiment, the isolation module 206 comprises a first set of windings 244 connected between nodes 222, 224 of the first conversion module 204 and a second set of windings 246 connected between nodes 234, 236. For purposes of explanation, the windings 246 may be referred to herein as comprising the primary winding stage (or primary windings) and the sets of windings 244 may be referred to herein as comprising the secondary winding stage (or secondary windings). The windings 244, 246 provide inductive elements that are magnetically coupled in a conventional manner to form a transformer, as will be appreciated in the art. In an exemplary embodiment, the isolation module 206 is realized as a high-frequency transformer. In this regard, the isolation module 206 comprises a transformer designed for a particular power level at a high-frequency, such as the switching frequency of the switches of the conversion modules 204, 208 (e.g., 50 kHz), resulting in the physical size of the transformer being reduced relative to a transformer designed for the same power level at a lower frequency, such as the frequency of the AC energy source 220 (e.g., the mains frequency).

In an exemplary embodiment, the inductive element 210 is realized as an inductor configured electrically in series between node 232 of the matrix converter 208 and a node 240 of the AC interface 214. Accordingly, for convenience, but without limitation, the inductive element 210 is referred to herein as an inductor. The inductor 210 functions as a high-frequency inductive energy storage element during operation of the electrical system 200. The capacitive element 212 is realized as a capacitor coupled between node 240 and node 242 of the AC interface 214, and the capacitor 212 and inductor 210 are cooperatively configured to provide a high frequency filter to minimize voltage ripple at the AC interface 214, as will be appreciated in the art.

The control module 216 generally represents the hardware, firmware and/or software configured to operate and/or modulate the switches of the conversion modules 204, 208 to achieve a desired power flow from the AC energy source 220 to the DC energy source 218. Depending on the embodiment, the control module 216 may be implemented or realized with a general purpose processor, a microprocessor, a microcontroller, a content addressable memory, a digital signal processor, an application specific integrated circuit, a field programmable gate array, any suitable programmable logic device, discrete gate or transistor logic, discrete hardware components, or any combination thereof, designed to support and/or perform the functions described herein.

During normal operation for grid-to-vehicle applications, the control module 216 determines pulse-width modulated (PWM) command signals that control the timing and duty cycles of the switches (1-8) of the matrix converter 208 to produce a high-frequency AC voltage across the primary windings 246 of the isolation module 206 which induces a voltage across the secondary windings 244 at nodes 222, 224 that results in a desired current ($i_{DC}$) flowing to the DC interface 202 to charge the DC energy source 218. For example, in accordance with one embodiment, the control module 216 generates a sinusoidal PWM variable duty cycle control signal that controls state machine transitions, and thereby, the duty cycle of the switches (1-8) to implement the appropriate switching pattern during a switching interval (e.g., the inverse of the switching frequency). The control module 216 obtains, monitors, or otherwise samples voltage at the DC interface 202 ($V_{DC}$) and compares the obtained DC voltage with a reference voltage (e.g., the desired voltage the DC interface 202) to obtain an error signal that is compared with high frequency carrier signal that corresponds to the switching frequency (e.g., 50 kHz) to obtain the sinusoidal PWM modulated duty cycle. When the error signal is less than the carrier signal, the control module 216 operates the switches 1-8 to effectively short-circuit nodes 232, 238 and cycle energy through the matrix converter 208 to apply a voltage across the inductor 210. When the error signal is greater than the carrier signal, the control module 216 operates the switches (1-8) to release the stored energy and/or voltage of the inductor 210 (alternatively, the fly-back voltage). The sum of the fly-back voltage and the voltage at the AC interface 214 is applied to the primary windings 246 of the isolation module 206, resulting in a power transfer to nodes 222, 224 and/or DC energy source 218. The control module 216 repeats the steps of operating the switches (1-8) to cycle energy through the matrix converter 208 when the error signal becomes less than the carrier signal and releasing the stored energy of the inductor 210 when the error signal is greater than the carrier signal. In this manner, the matrix converter 208 alternates between cycling energy through the inductor 210 and delivering energy to the isolation module 206 and/or DC interface 202 as needed throughout operation of the charging system 200.

It should be understood that FIG. 2 is a simplified representation of a electrical system 200 for purposes of explanation and is not intended to limit the scope or applicability of the subject matter described herein in any way. Thus, although FIG. 2 depicts direct electrical connections between circuit elements and/or terminals, alternative embodiments may employ intervening circuit elements and/or components while functioning in a substantially similar manner. Additionally, although the electrical system 200 is described herein in the context of a matrix converter 208 for a vehicle, the subject matter is not intended to be limited to vehicular and/or automotive applications, and the subject matter described herein may be implemented in any application where an energy conversion module (e.g., buck converters, boost converters, power inverters, current source inverters and/or converters, voltage source inverters and/or converters, and the like) is utilized to transfer energy using switching elements.

Figure 3:
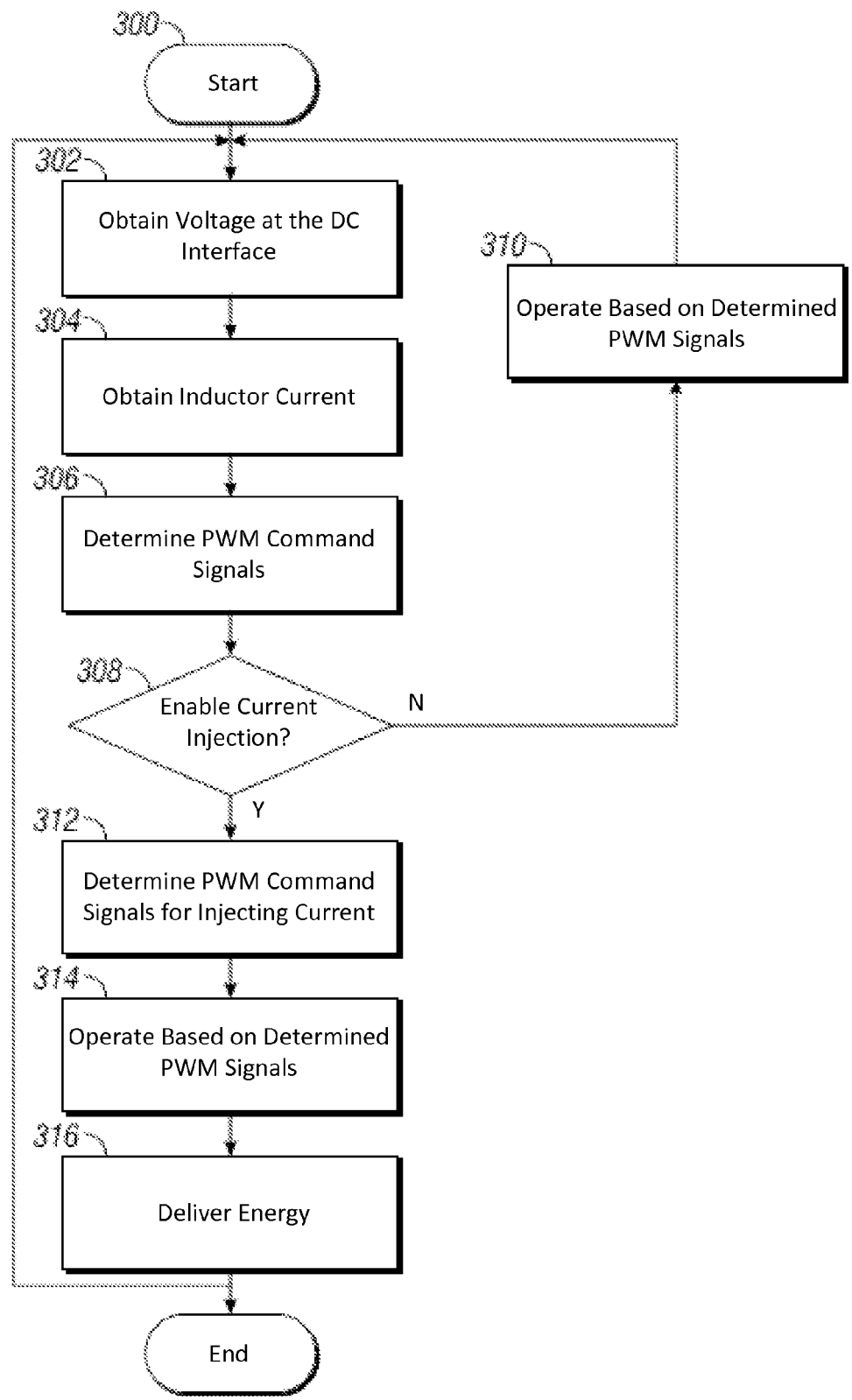
FIG. 3 is a flow diagram of control process suitable for use with the electrical system of FIG. 2 in accordance with one embodiment.

Referring now to FIG. 3, in an exemplary embodiment, an electrical system may be configured to perform a control process 300 and additional tasks, functions, and operations described below. The various tasks may be performed by software, hardware, firmware, or any combination thereof. For illustrative purposes, the following description may refer to elements mentioned above in connection with FIG. 2. In practice, the tasks, functions, and operations may be performed by different elements of the described system, such as the first conversion module 204, the isolation module 206, the matrix converter 208, and/or the control module 216. It should be appreciated that any number of additional or alternative tasks may be included, and may be incorporated into a more comprehensive procedure or process having additional functionality not described in detail herein.

Referring to FIG. 3, and with continued reference to FIG. 2, the control process 300 initializes or begins by obtaining the voltage at the DC interface and obtaining the inductor current (tasks 302, 304). For example, the control module 216 may obtain, sample, or otherwise measure the voltage at the DC interface 202 and the current through the inductor 210 (e.g., via a current sensor configured between the inductor 210 and node 232 or node 240). The control process 300 continues by determining PWM command signals for the switches of the matrix converter (task 306). In this regard, the control module 216 utilizes high-frequency PWM to modulate or otherwise operate the switches (1-8) of the matrix converter 208 to provide a desired voltage, current or power at the output 222, 224 of the secondary windings 244, in a similar manner as described above in the context of FIG. 2. The PWM command signals control the timing of the respective switches (1-8) of the matrix converter 208 over a switching interval (or PWM cycle), that is, when a respective switch is closed, turned on, or otherwise activated.

For example, referring again to FIG. 2, when the inductor current is in a positive direction (e.g., $i_L>0$), the control module 216 concurrently closes (or turns on) switches 2, 4, 6 and 8 to cycle or otherwise circulate the inductor current ($i_L$) through the matrix converter 208 to apply a voltage across the inductor 210. To release the stored energy and/or voltage of the inductor 210 and deliver a positive voltage across (or a positive current through) the secondary windings 244, the control module 216 opens (or turns off) switches 2 and 4 while maintaining switches 6 and 8 in a closed state, such that only switches 6 and 8 are conducting the inductor current ($i_L$) from node 232 to node 238 via the primary windings 246 to apply a positive voltage across the primary windings 246. After a particular amount of time, the control module 216 closes switches 2 and 4 to cycle energy through the matrix converter 208, as set forth above. To deliver a negative voltage across (or a negative current through) the secondary windings 244, the control module 216 opens (or turns off) switches 6 and 8 while maintaining switches 2 and 4 in a closed state, such that only switches 2 and 4 are conducting the inductor current ($i_L$) from node 232 to node 238 via the primary windings 246 to apply a negative voltage across the primary windings 246. The timing of when the switches 2, 4, 6 and 8 are closed as well as the duration for which the switches 2, 4, 6 and 8 are closed (i.e., the duty cycles) are determined by the control module 216 to provide a desired voltage (or current) at the output 222, 224 of the secondary windings 244, as described above.

In a similar manner, when the inductor current is in a negative direction (e.g., $i_L<0$), the control module 216 concurrently closes (or turns on) switches 1, 3, 5 and 7 to cycle or otherwise circulate the inductor current ($i_L$) through the matrix converter 208. To release the stored energy and/or voltage of the inductor 210 and deliver a positive voltage across (or a positive current through) the secondary windings 244, the control module 216 opens (or turns off) switches 5 and 7 while maintaining switches 1 and 3 in a closed state, such that only switches 1 and 3 are conducting the inductor current from node 238 to node 232 via the primary windings 246 to release the stored energy of the inductor 210 and apply a positive voltage across the primary windings 246. After a particular amount of time, the control module 216 closes switches 5 and 7 to cycle energy through the matrix converter 208, as set forth above. To deliver a negative voltage across (or a negative current through) the secondary windings 244, the control module 216 opens (or turns off) switches 1 and 3 while maintaining switches 5 and 7 in a closed state, such that only switches 5 and 7 are conducting the inductor current from node 238 to node 232 via the primary windings 246 to release the stored energy of the inductor 210 and apply a negative voltage across the primary windings 246. The timing of when the switches 1, 3, 5 and 7 are closed as well as the duration for which the switches 1, 3, 5 and 7 are closed (i.e., the duty cycles) are determined by the control module 216 to provide a desired voltage (or current) at the output 222, 224 of the secondary windings 244, as described above.

Referring again to FIG. 3, and with continued reference to FIG. 2, in accordance with one embodiment, the control process 300 determines whether current injection should be enabled (task 308). In this regard, the control module 216 may compare the obtained inductor current ($i_L$) to one or more threshold values to determine whether current injection should be enabled or disabled. For example, in one embodiment, the control module 216 obtains a measured value of the inductor current ($i_L$) (e.g., by sampling and/or reading a value from the current sensor) and determines a moving average ($\bar{i}_L$) for the inductor current based on the most recently obtained value of the inductor current ($i_L$) and previously obtained values for the inductor current. Determining a moving average reduces the effects of noise on the measured values for the inductor current, as will be appreciated in the art. When current injection was not previously enabled for a preceding switching interval, the control module 216 compares the magnitude of the moving average of the inductor current to a first threshold value, and enables current injection when the magnitude of the moving average is greater than the first threshold value. In this regard, the first threshold value is chosen to be a value for a magnitude of current through the inductor 210 that is sufficiently likely to produce transient voltage spikes across switches of the matrix converter 208 that would exceed the breakdown voltages of the switches 1-8. When current injection was enabled for a preceding switching interval, the control module 216 compares the magnitude of the moving average to a second threshold value, and disables current injection when the magnitude of the moving average is less than the second threshold value. In an exemplary embodiment, the first threshold value is greater than the second threshold value to provide hysteresis and prevent the control process 300 from oscillating between enabling and disabling current injection. For example, in accordance with one embodiment, the first threshold value is chosen to be about 4 amperes and the second threshold value is chosen to be about 2 amperes. It should be noted that in some embodiments, current injection may be enabled at all times regardless of the magnitude of the inductor current.

In an exemplary embodiment, in response to determining that current injection should not be enabled (or alternatively, that current injection should be disabled), the control process 300 continues by operating the matrix converter based on the PWM command signals for the switches of the matrix converter (task 310). In this manner, when the current injection is disabled, the control module 216 operates the switches 1-8 of the matrix converter 208 in accordance with the previously determined PWM command signals to alternate between cycling the inductor current through the matrix converter 208 and delivering energy to the DC interface 202 and/or DC energy source 218, as described above. The loop defined by tasks 302, 304, 306, 308 may repeat throughout operation of the electrical system 200 until the inductor current exceeds the first threshold value and the control process 300 determines that current injection should be enabled.

In response to determining that current injection should be enabled, the control process 300 continues by determining PWM command signals for injecting current through the primary windings of the isolation module to the matrix converter (task 312). In an exemplary embodiment, based on the voltage ($V_{DC}$) at the DC interface 202 and the inductor current, the control module 216 determines the timing and duty cycles (or pulse widths) for operating the switches 9-12 of the first conversion module 204 to provide an injection current through the primary windings 246 to reduce the current through one or more of the closed switches of the matrix converter 208 and prevent transient voltage spikes that exceed the breakdown voltages of the switches 1-8 when one or more switches of the matrix converter 208 are subsequently opened. In an exemplary embodiment, the control module 216 implements a two-dimensional lookup table and determines the timing and duty cycles for the switches 9-12 based on the magnitude (or amplitude) of the inductor current ($i_L$) and the voltage ($V_{DC}$) at the DC interface 202. In this regard, the lookup table consists of values for the duty cycles (or pulse widths) for concurrently turning on a respective pair of switches 9-12 and the timing for when the respective switches 9-12 should be turned on/off relative to opening a pair of switches of the matrix converter 208 to deliver energy to the DC interface 202. The control module 216 identifies or otherwise determines the pair of switches 9-12 to be closed concurrently to provide the injection current based on the anticipated direction of the current through the transformer 206. For example, based on the direction of the inductor current ($i_L$) and/or the PWM command signals for the switches 1-8 of the matrix converter 208, the control module 216 identifies switches 9 and 12 as the pair of switches to be closed to provide the injection current through the primary windings 246 from node 234 to node 236 before the matrix converter 208 is operated to apply a negative voltage to the primary windings 246 and identifies switches 10 and 11 as the pair of switches to be closed to provide the injection current through the primary windings 246 from node 236 to node 234 before the matrix converter 208 is operated to apply a positive voltage to the primary windings 246, as described in greater detail below.

After determining PWM command signals for providing an injection current through the primary windings of the isolation module, the control process 300 continues by operating the matrix converter based on the PWM command signals for the switches of the matrix converter and providing the injection current through the primary windings before delivering energy to the DC interface and/or DC energy source (tasks 314, 316). In this manner, the control module 216 operates the switches 1-8 of the matrix converter 208 in accordance with the previously determined PWM command signals to alternate between cycling the inductor current ($i_L$) through the matrix converter 208 and delivering energy to the DC interface 202 and/or DC energy source 218. The control module 216 operates the switches 9-12 of the first conversion module 204 in accordance with the previously determined PWM command signals for injecting current through the primary windings 246 of the isolation module 206 to conduct current through the secondary windings 244 and induce or otherwise provide the injection current through the primary windings 246 before opening one or more switches of the matrix converter 208 to deliver energy to the DC interface 202 and/or DC energy source 218. The loop defined by tasks 302, 304, 306, 308, 310, 312, 314 and 316 may repeat as desired throughout operation of the electrical system 200.

Figure 4:
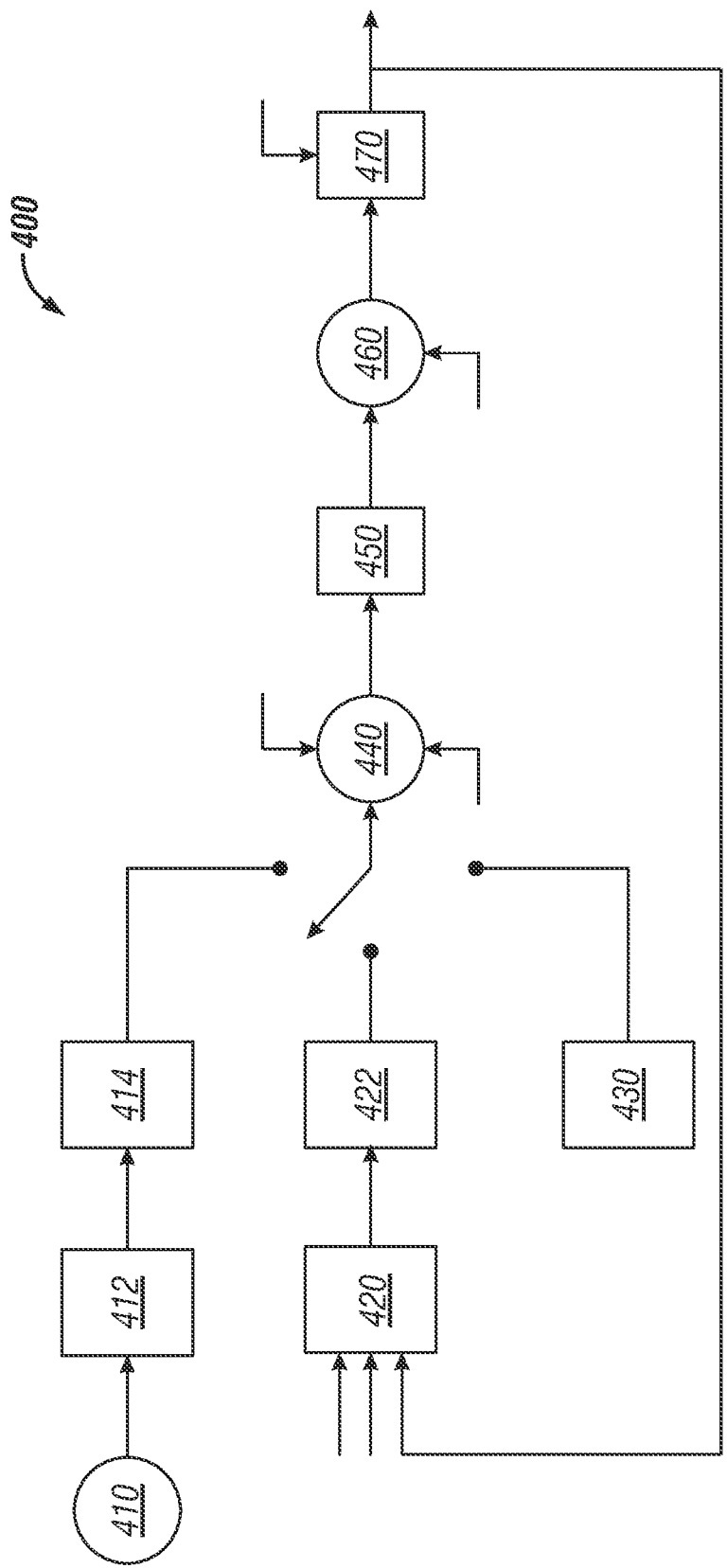
FIG. 4. illustrates a control strategy for use with the electrical system of FIG. 2 in accordance with one embodiment.

FIG. 4 illustrates an exemplary control strategy 400 which could be implemented, for example, by the control module 216. The control strategy includes a constant voltage mode, a constant voltage mode and a constant power mode. Each of the control strategies (i.e., constant voltage, current or power) generates a reference current Iref which is then used to calculate an off-time duty ratio Uref. Uref is then input to control module 216 and used to generate the PWM command signals for the switches 1-12 of the matrix converter as discussed above.

In order to determine the reference current Iref when operating in the constant voltage mode, the control module 216 first determines a voltage Vref required to charge the battery and measures the current voltage across the battery Vout. The controller then, at block 410, computes the result of equation 1.

$$\frac{Vref^2}{2} - \frac{Vout^2}{2} \quad (1)$$

The voltage output of block 410 is then input to voltage regulator 412. The voltage regulator 412 may be designed in a way to provide low pass functionality for the scaled energy error described in equation (1) (e.g. bellow 30 Hz) while providing phase boost for the outer voltage loop bandwidth frequency to be able to obtain a desired phase margin (e.g., >45 deg). The voltage regulator 412 outputs a power Pref based upon the output of block 410.

The controller then, at block 414, multiplies the power Pref by a ratio of the input AC voltage and the squared RMS AC voltage, according to equation 2.

$$Iref = Pref \times \left(\frac{Vac}{Vacrms^2}\right) \quad (2)$$

The output of block 414 is a reference current Iref which is used to generate the off-time duty ratio as described in further detail below.

In order to determine the reference current Iref when operating in the constant current mode, the control module 216 first determines a desired battery current Idcref and the actual battery current Ibattery. The estimator 420 then calculates a current Iacmax corresponding to a current drawn from the voltage source 220, according to equations 3-5.

$$Iacmax(0) = \sqrt{\left(\left(\frac{8 \cdot Vout^2 \cdot Idcref^2}{3 \cdot Vacmax^2}\right) + Icapmax^2\right)} \quad (3)$$

$$Iacmax((k+1)Ts) = Iacmax(kTs) + kp(Idcref(kTs) - Ibatteryrms(kTs)) \quad (4)$$

$$Iacmzx \leq \sqrt{\left(\left(\frac{Idcref^2}{Uref^2}\right) + Icapmax^2\right)} \quad (5)$$

Equation 3 defines an initial maximum current that can be drawn from the voltage source 220, where Vout corresponds to a present voltage across the battery 218, Vacmax corresponds to a maximum voltage which can be drawn from the voltage source 220 (the maximum voltage Vacmax can vary by country and/or based upon the type voltage source), and Icapmax is the maximum current capable of being handled by capacitor 212.

The controller then increases the maximum current based upon equation 4, where kTs represents a current time (in minutes, seconds, etc), (k+1)Ts represents a next time, kp represents a gain and Ibatteryrms represents a root-mean-square (RMS) of the current battery current. The gain kp is determined by the control module 216 and is used to control how quickly the current Iacmax is allowed to change. In one embodiment, for example, kp is determined by monitoring the dynamic response of ac current reference change. For example, in some instances it can be assumed that an incremental change in the ac current command is limited to a certain value and that kp can change adaptively to accommodate for that limit. In another embodiment, kp may be determined via experimental tuning to avoid unnecessary transients in the battery current.

The control module 216, while increasing the maximum current Iacmax, monitors Iacmax to ensure the current doesn't exceed a maximum amount of current using equation 5.

The current Iacmax output from estimator 420 is then multiplied, at block 422, by a gain corresponding to a ratio of the present voltage Vac from the voltage source 220 and the maximum voltage Vacmax capable of being drawn from the voltage source 220, according to equation 6.

$$Iref = Iacmax \times \left(\frac{Vac}{Vacmax}\right) \quad (6)$$

The output of block 422 corresponds to the current Iref used to determine which is used to generate the off-time duty ratio as described in further detail below.

In order to determine the reference current Iref when operating in the constant power mode, the control module 216 multiplies, at block 430, the desired constant power Pconst by a ratio of the current voltage Vac output by the voltage source 220 and the RMS voltage Vacrms output by the voltage source 220 in accordance with equation 7.

$$Iref = Pconst \times \left(\frac{Vac}{Vacrms^2}\right) \quad (7)$$

The control module then takes the reference current Iref, generated for either the constant voltage mode, constant current mode or constant power mode, and generates the off-time duty ratio Uref.

The control module 216 first calculates the difference Idiff between Iref and the current Icap across capacitor 212 and the current Iind (labeled current 290 in FIG. 2) across inductor 210 at block 440 in accordance with equation 8.

$$Idiff = -Iref + Icap + Iind \quad (8)$$

Because Uref is an off-time duty ratio Idiff is generally going to be a negative number. In another embodiment an on-time duty ratio could be used to control, for example, gates 1-12 in FIG. 2, where a positive Idiff would be used.

The control module then, at block 450, multiplies the current Idiff by a gain K1. Gain K1 is determined by the controller and may vary depending upon the needs of the system. The gain K1 directly affects the bandwidth of the system which effects how quickly Uref is changed. K1 is a gain that is directly proportional to the bandwidth of the inner current loop. Larger values of K1 can bring undesired oscillations in the current control because of small phase margin influenced by computational delays in the microcontroller. The output of block 450 is an error current signal with a dominant fundamental frequency component (e.g. 60 Hz).

The control module 216 then, at block 460, adds the current voltage Vac output from the voltage source 220 to the voltage output from block 450. Finally, the control module 220, at block 470, determines Uref by dividing the voltage output from block 460 by the current voltage Vout across the battery 218.

The off-time duty ratio Uref is then used to create the PWM command signals. Uref determines a ratio of effective time used for power delivery comparing to PWM period. As discussed above, the rate at which Uref is updated may vary. However, as discussed above, the PWM signals may be updated at a rate of 50 kHz.

For the sake of brevity, conventional techniques related to electrical energy and/or power conversion, electrical charging systems, power converters, pulse-width modulation (PWM), and other functional aspects of the systems (and the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter.

Techniques and technologies may be described herein in terms of functional and/or logical block components, and with reference to symbolic representations of operations, processing tasks, and functions that may be performed by various computing components or devices. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A charging system, comprising:
a rechargeable battery;
an interface configured to be coupled to a voltage; and
a controller configured to receive the voltage through the interface and to recharge the rechargeable battery using the received voltage,
wherein, when the controller is in a constant voltage mode, the controller provides a constant voltage to the rechargeable battery,
when the controller is in a constant current mode, the controller provides a constant current to the rechargeable battery, and
when the controller is in a constant power mode, the controller provides a constant power to the rechargeable battery,
wherein the controller further comprises a matrix conversion module including a plurality of gates which control a flow of current from the voltage source to the rechargeable battery, wherein the controller selectably operates the gates based upon which mode the controller is in.

2. The charging system of claim 1, wherein the controller determines whether it is in the constant voltage, constant current or constant power mode based upon a state of the rechargeable battery.

3. The charging system of claim 1, wherein the controller, when in the constant power mode, limits an amount of power that can be drawn from the voltage source.

4. The charging system of claim 3, wherein the controller is further configured to allow a user select the amount of power drawn from the voltage source.

5. The charging system of claim 3, wherein the amount of power drawn from the voltage source is based upon a power capacity of the voltage source.

6. The charging system of claim 1, wherein the controller is further configured to generate a reference current depending upon the mode the controller is in, and to use the reference current to create an off-duty time ratio to control the plurality of gates.

7. An electrical system, comprising:
a load;
an interface configured to receive a voltage; and
a controller configured to receive the voltage through the interface and to provide a voltage and current to the load,
wherein, when the controller is in a constant voltage mode, the controller provides a constant voltage to the load,
when the controller is in a constant current mode, the controller provides a constant current to the load, and
when the controller is in a constant power mode, the controller provides a constant power to the load,
wherein the controller further comprises a matrix conversion module including a plurality of gates which control a flow of current from the voltage source to the load, wherein the controller selectably operates the gates based upon which mode the controller is in.

8. The electrical system of claim 7, wherein the controller determines whether it is in the constant voltage, constant current or constant power mode based upon a state of the load.

9. The electrical system of claim 7, wherein the controller, when in the constant power mode, limits an amount of power that can be drawn from the voltage source.

10. The electrical system of claim 9, wherein the controller is further configured to allow a user select the amount of power drawn from the voltage source.

11. The electrical system of claim 9, wherein the amount of power drawn from the voltage source is based upon a power capacity of the voltage source.

12. The electrical system of claim 7, wherein the controller is further configured to generate a reference current depending upon the mode the controller is in, and to use the reference current to create an off-duty time ratio to control the plurality of gates.

13. A method of providing a voltage and current to a load from a controller coupled to the load, comprising:
providing, when the controller is in a constant current mode, a constant current charge to the load;
providing, when the controller is in a constant voltage mode, a constant voltage to the load;
providing, when the controller is in a constant power mode, a constant power charge to the load; and
selecting, by a user, the amount of power drawn from the power source and provided to the load.

14. The method of claim 13, further comprising changing a mode of the controller based upon a state of the load.

15. The method of claim 13, further comprising changing a mode of the controller based upon a state of the power source.

16. The method of claim 13, further comprising changing a mode of the controller based upon a user input.

17. The method of claim 13, further comprising limiting, by the controller when the controller is in a constant power mode, an amount of power drawn from a power source and provided to the load.

* * * * *